United States Patent
Beccarini et al.

(10) Patent No.: US 6,541,570 B2
(45) Date of Patent: Apr. 1, 2003

(54) COMPOSITIONS OF RANDOM COPOLYMERS OF PROPENE CONTAINING AN α-OLEFIN AS COMONOMER

(75) Inventors: Enrico Beccarini, Ferrara (IT); Anteo Pelliconi, Rovigo (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/913,386

(22) PCT Filed: Dec. 14, 2000

(86) PCT No.: PCT/EP00/12739

§ 371 (c)(1),
(2), (4) Date: Aug. 13, 2001

(87) PCT Pub. No.: WO01/44367

PCT Pub. Date: Jun. 21, 2001

(65) Prior Publication Data

US 2002/0177665 A1 Nov. 28, 2002

(30) Foreign Application Priority Data

Dec. 16, 1999 (EP) ............................................. 99204334

(51) Int. Cl.⁷ ......................... C08L 23/00; C08L 23/04; C08L 23/10; C08F 297/08
(52) U.S. Cl. ....................................... 525/191; 525/240
(58) Field of Search ................................. 525/191, 240

(56) References Cited

U.S. PATENT DOCUMENTS

| | | | | |
|---|---|---|---|---|
| 4,211,852 A | | 7/1980 | Matsuda et al. ............. | 525/240 |
| 4,245,062 A | * | 1/1981 | Suzuki et al. ................ | 525/240 |
| 5,326,639 A | * | 7/1994 | Leonard et al. ............. | 428/402 |
| 6,180,720 B1 | * | 1/2001 | Collina et al. .............. | 525/191 |

FOREIGN PATENT DOCUMENTS

| | | |
|---|---|---|
| EP | 0361493 | 4/1990 |
| EP | 0560326 | 9/1993 |
| EP | 0663422 | 7/1995 |
| EP | 0674991 | 10/1995 |
| EP | 0719829 | 7/1996 |
| EP | 0728769 | 8/1996 |

* cited by examiner

*Primary Examiner*—Nathan M. Nutter

(57) ABSTRACT

Semicrystalline polyolefin composition comprising copolymers a), b) and c) of prolylene with at least one comonomer selected from $C_4$–$C_{10}$ α-olefins, where the total content of recurring units from the said comonomer, referred to the composition, is equal to or higher than 6% and teh respective percentages representing the content of said recurring units in each one of the copolymers a), b) and c) are different from each other, said difference being of at least 1 unit.

7 Claims, No Drawings

COMPOSITIONS OF RANDOM COPOLYMERS OF PROPENE CONTAINING AN α-OLEFIN AS COMONOMER

The present invention concerns compositions of random copolymers of propylene with one or more $C_4$–$C_{10}$-α-olefins, and the process to obtain the said compositions. The present invention also relates to articles produced by using the cited compositions.

Articles whose production requires the use of high temperatures can be prepared with the polyolefin compositions of the present invention. For example, certain types of laminate articles, i.e. sheet and film, require such an operative condition. As a particular example, the said copolymer compositions are suitable for the production of metallized articles, more in particular metallized films. The films can be either monolayer or multilayers. The said compositions can, therefore, be useful for the production of metallized single-layer and multilayer films.

Articles produced with the compositions of the present invention are particularly suitable for being employed in the food industry because of their low content of component soluble in xylene at room temperature. Therefore, the said articles can be used in the food packaging field.

Polyolefin compositions comprising a mixture of two or three copolymers of propylene with an α-olefin, mainly 1-butene, are already known. The said prior art compositions are suitable for the production of low-temperature heat-sealable films.

For example, U.S. Pat. No. 4,211,852 describes a thermoplastic olefin resin composition made up of a poly (propylene-co-butene-1) with at least 15 mole % of recurring units deriving from 1-butene and a copolymer of propylene with ethylene or 1-butene containing up to 10 mole % of recurring units deriving from the comonomer. However, in examples the compositions made up of two copolymers do not contain two polymers of the type poly (propylene-co-butene-1) and the 1-butene content in the poly(propylene-co-butene-1) is about 35% by weight.

European patent application 560 326 also describes a thermoplastic olefin resin composition comprising a random poly(propylene-co-butene-1) with from 1 to 10 wt % of recurring units deriving from 1-butene and a random poly (propylene-co-butene-1) containing from 15 to 40 wt % of recurring units deriving from 1-butene.

European patent application 719 829 describes polyolefin compositions comprising a mixture of three copolymers of propylene with an α-olefin, mainly 1-butene. At least one copolymer contains a high amount of comonomer (25% by weight or more). Films prepared with the described compositions have low values of heat-sealing temperature as shown by the working examples wherein the films have a value of the heat-sealing temperature of 92° C. or less.

Although the cited prior art compositions have a high melting temperature, they are not suitable for being metallized. The main drawback of the said compositions is due to a too high amount of polymer fraction with a low crystallinity thanks to which the films obtained from the said prior art compositions are low-temperature heat-sealable.

The applicant has now found new compositions that have a high melting temperature and VICAT value. The said properties enable the polymer to be subjected to high temperatures such as those required in metallization process.

A particular advantage of the copolymer compositions of the present invention is that they have a low solubility in xylene at room temperature and can have a good transparency. The said properties are particularly desirable in the food industry.

The compositions of the present invention, moreover, have a rather high rigidity. Thanks to the said property, films with a homogenous thickness are produced.

Therefore, the present invention provides a semicrystalline polyolefin composition comprising (all percentages by weight):

a) 25–40%, preferably 28–38%, of a random copolymer of propylene with at least one comonomer selected from $C_4$–$C_{10}$, α-olefins, containing from 2 to 10% of recurring units deriving from the comonomer;

b) 25–40%, preferably 26–36%, of a random copolymer of propylene with at least one comonomer selected from $C_4$–$C_{10}$α-olefins, containing from 10 to 20% of recurring units deriving from the comonomer;

c) 25–40%, preferably 28–38%, of a random copolymer of propylene with at least one comonomer selected from $C_4$–$C_{10}$α-olefins containing from 6 to 12% of recurring units deriving from the comonomer;

where the total content of recurring units from the said comonomer, referred to the composition, is equal to or higher than 6% and the respective percentages representing the content of the said recurring units in each one of copolymers a), b) and c) are different from each one of the other two, said difference with respect to the percentage of recurring units in each one of the other two copolymers being of at least 1 unit, preferably 1.5 units.

From the above definitions it is evident that the term "copolymer" includes polymers containing more than one kind of comonomers.

Examples of said $C_4$–$C_{10}$α-olefins are 1-butene, 1-pentene, 1-hexene, 1-octene and 4-methyl-1-pentene. Particularly preferred is 1-butene.

The preferred semicrystalline polyolefin compositions are those where the comonomer of copolymers (a), (b) and (c) is the same.

The said composition has, typically, a seal initiation temperature (SIT) from 110° C. to 120° C. The VICAT value is generally from 115 to 140° C., preferably 125–135° C.

The said composition, moreover, has generally values of heat distortion temperature (HDT) ranging from 65 to 75° C.

Moreover it has generally values of flexural elastic modulus ranging from 900 to 1300 MPa, preferably 950–1250 MPa. The haze value is generally 40% or less determined on a 1 mm-thick plaque. The melt flow rate (condition L) value is generally from 0.1 to 100 g/10 min. The above properties are determined according to the methods described in the examples.

The composition of the present invention can by prepared by the known methods.

One method is by mechanically blending of copolymers (a), (b) and (c) in the molten state. The blending process is, therefore, carried out at the melt temperature of the copolymers or above.

The preferred method is by way of sequential polymerisation of the monomers in the presence of a catalyst, such as stereospecific Ziegler-Natta catalysts.

The sequential polymerisation is carried out in at least three separate and subsequent stages, wherein copolymers (a), (b) and (c) of the present invention are prepared. In each stage subsequent to the first stage the polymerisation takes place in the presence of the polymer obtained and the catalyst used in the preceding stage. It is preferred to prepare first the random copolymer containing the lowest amount of comonomer and than the other two copolymers.

The polymerisation process can be carried out in liquid phase, in the presence or absence of inert solvent, or in gas phase, or using mixed liquid and gas phases. Preferably the polymerisation is carried out in gas phase.

The regulation of the molecular weight is done by using known regulators, preferably hydrogen.

The polymerisation can be preceded by a prepolymerisation step where the catalyst is caused to contact with small quantities of olefins.

The previously said Ziegler-Natta catalysts comprise a solid catalyst component and a cocatalyst. The solid catalyst component comprises a titanium compound having at least one titanium-halogen bond and an electron-donor compound (internal donor), supported on a magnesium dihalide in active form. The magnesium dihalide support is preferably in the form of spheroidal particles having a narrow particle size distribution.

The internal donor is generally selected from ethers, ketones, lactones, compounds containing N, P and/or S atoms and esters of mono- and dicarboxylic acids. Particularly suitable electron-donor compounds are phthalic acid esters, such as diisobutyl, dioctyl, diphenyl and benzylbutyl phthalate.

Other electron-donor compounds particularly suitable are 1,3-diethers of formula:

$$(R^I)(R^{II})C(CH_2OR^{III})(CH_2OR^{IV})$$

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of the said diethers are 2-methyl-2-isopropyl-1,3-dimethoxypropane. 2,2-disobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl)fluorene.

The preparation of the above mentioned solid catalyst component is carried out according to various methods.

For example, a MgCl$_2$.nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The active form of magnesium halide in the solid catalyst component can be recognized by the fact that in the X-ray spectrum of the catalyst component the maximum intensity reflection appearing in the spectrum of the nonactivated magnesium halide (having a surface area smaller than 3 m$^2$/g) is no longer present, but in its place there is a halo with the maximum intensity shifted with respect to the position of the maximum intensity reflection of the nonactivated magnesium dihalide, or by the fact that the maximum intensity reflection shows a width at half-peak at least 30% greater than the one of the maximum intensity reflection which appears in the spectrum of the nonactivated magnesium halide. The most active forms are those where the above mentioned halo appears in the X-ray spectrum of the solid catalyst component.

Among magnesium halides, the magnesium chloride is preferred. In the case of the most active forms of magnesium chloride, the X-ray spectrum of the solid catalyst component shows a halo instead of the reflection which in the spectrum of the nonactivated chloride appears at 2.56 Å.

The cocatalyst is generally an Al-alkyl compound alone or combined with an electron-donor compound (external donor).

The Al-alkyl compound is generally of the trialkyl aluminium type, such as Al-triethyl, Al-triisobutyl, Al-tri-n-butyl, and linear of cyclic Al-alkyl compounds containing two or more Al atoms bonded by way of O or N atoms or SO$_2$, SO$_3$, and SO$_4$ groups.

Some examples of these compounds are:
(C$_2$H$_5$)$_2$Al—O—Al (C$_2$H$_5$)$_2$;
(C$_2$H$_5$)$_2$Al—N(C$_6$H$_5$)—Al (C$_2$H$_5$)$_2$;
(C$_2$H$_5$)$_2$Al—SO$_2$—Al(C$_2$H$_5$)$_2$;
CH$_3$ [(CH$_3$)Al—O]$_n$—Al(CH$_3$)$_2$;
—[(CH$_3$)Al—O—]$_n$
where n is a number from 1 to 20.

One can also use AlR$_2$H compounds, and AlR$_2$OR' compounds, where R is an alkyl radical having from 1 to 6 carbon atoms, and R' represents an aryl radical substituted in one or more positions.

The Al-alkyl compound is generally present in such amounts that the Al/Ti ratio ranges from 1 to 1000.

The external electron-donor compound can be selected from esters of aromatic acids (such as alkyl benzoates), heterocyclic compounds (such as 2,2,6,6-tetramethylpiperidine, and 2,6-diisopropylpiperidine) and particularly silicon compounds containing at least one Si—OR bond (where R is a hydrocarbon radical). Some examples of silicon compounds are (t—C$_4$H$_9$)$_2$Si(O CH$_3$)$_2$,(C$_5$H$_9$)$_2$Si(O CH$_3$)$_2$,(C$_6$H$_{11}$)$_2$Si(O CH$_3$)$_2$, (C$_6$H$_{11}$)(CH$_3$)Si(O CH$_3$)$_2$ and (C$_6$H$_5$)$_2$Si(O CH$_3$)$_2$.

The 1,3-diethers of formula (I) can also be used advantageously as external electron-donor compounds. In the case where the internal electron-donor compound is one of the 1,3-diethers of formula (I), the external electron-donor compound can be omitted.

The compositions of the present invention can also contain additives commonly employed in the art, such as antioxidants, light stabilisers, heat stabilisers, pigments and so on.

As previously said, the compositions of the present invention are particularly useful for the preparation of laminate articles, i.e. films and sheets. Due to the features of the polymer compositions, metallized laminate articles, in particular films, can be produced. Films are generally characterised by a thickness of less than 100 μm, while sheets have a thickness equal to or higher than 100 μm.

The films of the present invention can be cast or, preferably, bioriented.

The films and sheets can be single-layer or multilayer.

The multilayer film or sheet has at least one cast or bioriented layer comprising the composition according to the present invention. The layer that comprises the composition of the present invention can be an outer layer or an inner layer.

The further layer(s) can comprise olefin polymers or other polymers. The preferred olefin polymers are propylene polymers. The said further layer can comprise a polymer having low-temperature heat-sealing properties, for example. A practical example of the multilayer film with the said properties is a triple-layer film having an ABC-type structure wherein one of the outer layers comprises the composition according to the present invention. The middle layer can be a crystalline propylene homopolymer. The other outer layer can be a random copolymer of propylene with a low amount (less than 10% by weight) of recurring units deriving from ethylene and/or butene-1.

The films of the present invention can be prepared by known methods, such as extrusion, calendering and bubble.

A further object of the present invention is a metallized laminate article, sheet or, preferably, film. Both the said single-layer or multilayer laminate articles can be subjected to metallization process. Where a multilayer laminate article is metallized, an outer layer is made of the composition according to the present invention.

Where the laminate article is metallized, for example, the process for metallizing is carried out, for example, by subliming a metal on the surface of the film according to the known methods. The used metal generally belongs to the groups I B to III B of the Periodic Table, such as aluminium and zinc.

Another object of the present invention is a multilayer laminate article obtainable by extrusion lamination of a polymer on the layer comprising the polymer composition of the present invention. The said layer can be metallized as well as non-metallized. The polymer used in the extrusion lamination process has, preferably, a melting temperature equal to or less than 150° C., for example polyethylene and polyethylene terephthalate.

The metallized films of the present invention have a good barrier effect. The said advantageous effect is due to the composition of the present invention that enables a good adhesion of the metal to the polymer layer.

The following examples illustrate but do not limit the method of preparation and the characteristics of the composition of the present invention.

The data shown in the tables are obtained by using the following analytical methods.

- Molar ratios of the feed gases: determined by gas-chromatography.
- 1-butene content: determined by I.R. spectroscopy.
- Xylene soluble fraction: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with a filter paper, the solution evaporated in nitrogen flow, and the residue dried under vacuum at 80° C. until constant weight is reached. Thus one calculates the percent by weight of polymer insoluble in xylene at ambient temperature (i.e., 25° C.).
- Melt flow rate (MFR"L"): determined according to method ASTM D 1238, condition L.
- VICAT: determined according to method ISO 306.
- HDT: determined according to method ISO 75.
- Flexural elastic modulus: determined according to method ASTM D 790.
- RCI IZOD impact strength: determined according to method ISO 180/1A.
- Rockwell R hardness: determined according to internal method MA 17013, available upon request. A Durometer Galileo A-200 instrument is used. A 6 mm-thick specimen having sides of 12.7 mm is cut from an injection moulded plate.

The test is carried out at 23° C.; 50% is the relative humidity. A load of 588.4 N is applied to the specimen for 15 seconds. The load is spherical punch-shaped. The diameter of the spherical punch is of 12.7 mm. After removing one waits 1 seconds before reading the value of hardness on the scale of the durometer. At least 5 tests are performed at different points in the specimen.

The Rockwell hardness alpha ($R_\alpha$) is calculated with la following formula:

$$R_\alpha = 150 - (d_h - d_m)$$

wherein $d_h$ is the value read on the scale of the durometer and $d_m$ is the elastic constant of the durometer.
- Fish eyes: determined according to internal method MTM 17108E, available upon request. A 50 $\mu$m-thick film specimen is cut from a film produced by a Bandera 45 extruder equipped with a film drive unit and chill rolls (Dolci.) The film specimen is inserted in a specially provided slot of a projector (projector Neo Solex 1000 with a lamp of 1000 W and objective Neo Solex F 300 equipped with apparatus for collecting the film). Then the film specimen is examined on the wall-chart by counting the number of gels and by noting their dimension.
- WVTR water vapour: determined according to internal method MA 18073, available upon request. The test is carried out on a film specimen.

The film specimen is fixed on a small stainless steel vessel (diameter: 59 mm, high: 37 mm) containing 5 ml of distilled water. After weighting the said vessel, it is turned upside-down so that the water comes into contact with the film and placed in a room at 23($\pm$1)° C. and 50($\pm$5)% of relative humidity at least for 120 hours. The vessel is weighted every 24 hours.

The permeability coefficient of the film to the water vapour is calculated by using the following formula $$(G \cdot s)/(a \cdot t)$$

wherein G is measured in grams and is the average decrease of the weight of water every 24 hours; s is the thickness of the film; a is 1 m$^2$; and t is 24 hours.
- OTR oxygen: determined according to internal method MA 17275, available upon request. The test is carried out on a film equal to the one used in the WVTR water vapour test. The film specimen having diameter about of 75 mm is cut from a film. The specimen is previously kept in a dryer at 23° C. under vacuum (about 1 Pa, i.e 0.01 mbar) for 24 hours.

The specimen is placed in the middle of a closed steel vessel so that the vessel is dived into two rooms. The air pressure is reduced under 0.1 Pa (0.001 mbar) in the vessel using a vacuumeter Datametrics type 1500. Then the oxygen is introduced in one of the rooms until a pressure of 0.05 MPa (0.5 bar); the oxygen pressure is measured by an Edward EPV 251 manometer. Afterwards the pressure of the other room is measured at regular intervals of times until a regular increase of pressure is observed.

After calculation of linear regression line based on the experimental pressure values, the coefficient of permeability (CP) of the film to the gas is calculated by using the following formula:

$$CP = V \cdot [dP(t)/dt] \cdot [273/(273+T)] \cdot 76^{-1} \cdot (L/A) \cdot P_1^{-1}$$

wherein V is measured in ml and is the volume of the vessel; P=pressure of the filtered gas; [dP(t)/dt]= angular coefficient of the interpolation line; T is measured in ° C. and is the temperature at which the test is carried out; L=thickness of the sample; A=surface of the sample subjected to the gas flow; $P_1$=pressure of the gas put in; t=time.

Haze: determined according to method ASTM D 1003.

Gloss: determined according to method ASTM D 2457.

Melting temperature: determined by DSC (Differential Scanning Calorimetry).

Seal initiation temperature (SIT): determined by preparing 50 μm-thick films by extruding the compositions of the examples at about 200° C. Each film thus obtained is laid over a plaque of polypropylene having a xylene-soluble of 4% by weight, melt flow rate of 2 g/10 min. The overlapped film and plaque are bonded in a plate-press at 200° C. with a load of 9000 kg. The said load is maintained for 5 minutes. The resulting bonded test pieces are then stretched six times their length and width using a TM LONG film stretcher, thus obtaining films of a thickness of about 20 μm. 5×10 cm specimens are obtained from the said films. The sealing values are obtained by applying a 200 g load to heat-sealed samples. For each measurement two of the above specimens are overlapped with the heat-sealable layers, made up of the compositions of the examples, touching each other. The said overlapped specimens are then sealed along the 5 cm side using a Xentinel combination laboratory sealer model 12–12 AS. The sealing time is 5 seconds, the pressure about 0.12 MPa (1.2 atm) and the width of the seals 2.5 cm. The sealing temperature is increased by 2° C. for each sample to be measured. The sealed samples are then cut to obtain 2.5×10 cm strips, whose unsealed ends are attached to a dynamometer, and the minimum seal temperature where the seal does not break when a 200 g load is applied is determined. This temperature represents the seal initiation temperature.

EXAMPLES 1–2 and COMPARATIVE EXAMPLE 1c

The compositions are prepared by sequential polymerisation, i.e. the polymerisation is carried out in continuous in a series of reactors equipped with devices for the transfer of the product from one reactor to the one immediately next to it.

The catalyst used in polymerisation is a highly stereospecific Ziegler-Natta catalyst comprising a solid component supported on magnesium chloride, containing about 2.5% by weight of titanium and diisobutylphthalate as internal electron-donor component. The solid catalyst component is prepared by analogy with the method described in the examples of European published patent application 674991.

During polymerisation the gas phase is continuously analysed by gaschromatography in order to determine the content of propylene, 1-butene, hydrogen and propane. The above mentioned gasses are fed in such a way that during the course of the polymerisation their concentration in gas phase remains constant.

Before introducing the catalyst system into the polymerisation reactors, the above solid catalyst component is contacted at 20° C. for 9 minutes with Al-triethyl (TEA) and dicyclopentyldimethoxysilane (DCPMS) in liquid propane. The TEAL/solid catalyst weight ratio is 10 and the TEA/DCPMS ratio is 4.

The above catalyst system is then transferred into a reactor containing an excess of liquid propylene and propane to carry out prepolymerisation at 25° C. for 30 minutes before introducing it into the first polymerisation reactor.

Into a first gas phase polymerisation reactor a poly (propylene-co-butene-1) (copolymer (a)) is produced by feeding in a continuous and constant flow the prepolymerised catalyst system, hydrogen (used as molecular weight regulator) and propylene and 1-butene monomers and propane in the gas state.

The copolymer produced in the first reactor is discharged and, after having been purged of unreacted monomers, is introduced in a continuous flow into the second gas phase reactor together with quantitatively constant flows of hydrogen, propylene and 1-butene and propane in gas state.

The copolymer produced in the second reactor (copolymer (b)) is discharged and, after having been purged of unreacted monomers, is introduced in a continuous flow into the third gas phase reactor together with quantitatively constant flows of hydrogen, propylene and 1-butene and propane in gas state, to produce copolymer (c).

The polymer particles exiting the third reactor are subjected to a steam treatment to remove the reactive monomers and volatile substances and then dried.

The polymerisation temperature is of 70° C. in all stages.

The polymerisation conditions, molar ratios of reactants, the composition of the copolymer produced in each stage and the composition of the final polymer product and its properties are shown in Table 1.

The composition of example 1 and the one of the comparative example 1c are utilised for preparing a bioriented triple-layer film having a thickness of 25 μm. The layers are as follows:

a 1 μm-thick outer layer (layer A) is made up of a random copolymer of propylene containing 3.3 wt % and 6 wt % of recurring units deriving from ethylene and 1-butene, respectively;

the 23 μm-thick middle layer (layer B) is made up of a crystalline propylene homopolymer;

the other outer 1 μm-thick layer (layer C) is made up of the composition of example 1 or the one of the comparative example 1c.

The said three-layer film is prepared by coextrusion using a Brückner extrusion system. Then the film is subjected to metallization process according to known methods wherein layer C is metallized with aluminium.

The film so obtained is subjected to the WVTR water vapour test and OTR oxygen test.

Table 2 shows the mechanical and physical properties of the films or plaques prepared with the compositions of the present invention.

TABLE 1

| Example and comparative example | 1c | 1 | 2 |
|---|---|---|---|
| Stage (i) | | | |
| Pressure (MPa) | 2.1 | 1.7 | 1.9 |
| $H_2/C_3$ (mol) | 0.046 | 0.017 | 0.015 |
| $C_4^-/(C_4^- + C_3^-)$ (mol) | — | — | 0.06 |
| Copolymer (a) content[1] (wt %) | 66 | 35 | 35 |
| 1-butene content in copolymer (a) (wt %) | 8.3 | 5.9 | 3.1 |
| MFR "L" (g/10 min) | 6.3 | 5.8 | 6.0 |
| Stage (ii) | | | |
| Pressure (MPa) | 2.1 | 1.9 | 1.9 |
| $H_2/C_3^-$ (mol) | 0.077 | 0.060 | 0.053 |
| $C_4^-/(C_4^- + C_3^-)$ (mol) | 0.15 | — | 0.23 |
| Copolymer (b) content[1] (wt %) | 34 | 30 | 30 |
| 1-butene content in copolymer (b) (wt %) | 10.4 | 12.2 | 15.4 |
| MFR "L" (g/10 min) | 5.8 | 7.1 | 5.2 |
| Stage (iii) | | | |
| Pressure (MPa) | — | 1.9 | 1.9 |
| $H_2/C_3$ (mol) | — | 0.064 | 0.057 |
| $C_4^-/(C_4^- + C_3^-)$ (mol) | — | 0.15 | 0.16 |
| Copolymer (c) content[1] (wt %) | 0 | 35 | 35 |
| 1-butene content in copolymer (c) (wt %) | 0 | 9.1 | 9.1 |
| Final Composition | | | |
| MFR "L" (g/10 min) | 5.8 | 5.5 | 4.5 |
| 1-butene content (wt %) | 9.0 | 8.9 | 8.9 |
| Xylene soluble fraction (wt %) | 2.5 | 2.5 | 6.2 |
| Melting temperature (° C.) | 145 | 145 | 151 |
| Temperature at which 30% of the composition is melted (° C.) | 117.5 | 118.5 | 120.0 |

[1]Copolymer content with respect to the final composition.

TABLE 2

| Example and comparative example | 1c | 1 | 2 |
|---|---|---|---|
| VICAT (° C.) | 128 | 129 | 132 |
| SIT (° C.) | 118 | 118 | 116 |
| HDT 455 kPa (° C.) | 73 | 71 | 72 |
| Flexural elastic modulus (MPa) | 1080 | 1110 | 1140 |
| RCI IZOD impact strength (kJ/m$^2$) | 5.3 | 6.4 | 6.9 |
| Hardness Rockwell R (° R.) | 100.8 | 102 | 101 |
| Fish eyes >1.5 mm (n°/m$^2$) | 0 | 0 | 0 |
| Fish eyes 0.7–1.5 mm (n°/m$^2$) | 2 | 1 | 0 |
| Fish eyes 0.5–0.7 mm (n°/m$^2$) | 7 | 4 | 2 |
| Fish eyes >0.1 mm (n°/m$^2$) | 500 | 270 | 250 |
| Haze on 50 μm thick film (%) | 1.7 | 1.6 | 1.5 |
| Haze on 1 mm thick plaque (%) | 34.7 | 35.0 | 36.7 |
| Gloss 60° on 1 mm thick plaque (%) | 83.0 | 84.8 | 84.5 |
| Gloss 45° on 1 mm thick plaque (%) | 58.0 | 59.6 | 59.6 |
| WVTR water vapour (g/(m$^2$·24 hours)) | 0.25 | — | 0.17 |
| OTR oxygen[1] (ml/(m$^2$·24 hours)) | 45 | — | 30 |

[1]The test is carried out at ambient temperature for a time of 20 minutes; the surface of the film sample under test is 5 cm$^2$.

What is claimed is:

1. A semicrystalline polyolefin composition comprising (all percentages by weight):
   a) 25–40% of a random copolymer of propylene with at least one comonomer selected from $C_4$–$C_{10}$ α-olefins, containing from 2 to 10% of recurring units deriving from the comonomer;
   b) 25–40% of a random copolymer of propylene with at least one comonomer selected from $C_4$–$C_{10}$ α-olefins, containing from 10 to 20% of recurring units deriving from the comonomer;
   c) 25–40% of a random copolymer of propylene with at least one comonomer selected from $C_4$–$C_{10}$ α-olefins, containing from 6 to 12% of recurring units deriving from the comonomer;
   where the total content of recurring units from the said comonomer, referred to the composition, is equal to or higher than 6% and the respective percentages representing the content of the said recurring units in each one of copolymers a), b) and c) are different from each one of the other two, said difference with respect to the percentage of recurring units in each one of the other two copolymers being of at least 1 unit.

2. The composition of claim 1, where the comonomer of copolymers (a), (b) and (c) is the same.

3. The composition of claim 2, where the comonomer of copolymers (a), (b) and (c) is 1-butene.

4. The semicrystalline polyolefin composition of claim 1, wherein the amount of the random copolymer (a) is 28–38%.

5. The semicrystalline polyolefin composition of claim 1, wherein the amount of the random copolymer (b) is 26–36%.

6. The semicrystalline polyolefin composition of claim 1, wherein the amount of the random copolymer (c) is 28–38%.

7. The semicrystalline polyolefin composition of claim 1, wherein the difference with respect to the percentage of recurring units in each one of the other two copolymers is of at least 1.5 units.

* * * * *